US007333467B2

(12) United States Patent
Kuehnle et al.

(10) Patent No.: US 7,333,467 B2
(45) Date of Patent: Feb. 19, 2008

(54) RECEIVER CIRCUIT AND METHOD USING SELECTIVELY VARIABLE AMPLIFICATION FOR RECEIVING TIME SIGNALS FROM DIFFERENT TRANSMITTERS

(75) Inventors: Joachim Kuehnle, Erlenbach (DE); Roland Polonio, Neckarsulm (DE); Hans-Joachim Sailer, Heilbronn (DE)

(73) Assignees: ATMEL Germany GmbH, Heilbronn (DE); C-MAX Europe GmbH, Heilbronn (DE)

( * ) Notice: Subject to any disclaimer, the term of this patent is extended or adjusted under 35 U.S.C. 154(b) by 292 days.

(21) Appl. No.: 11/009,414

(22) Filed: Dec. 8, 2004

(65) Prior Publication Data

US 2005/0122951 A1 Jun. 9, 2005

(30) Foreign Application Priority Data

Dec. 8, 2003 (DE) ................................ 103 57 200
Jan. 20, 2004 (DE) ...................... 10 2004 002 776

(51) Int. Cl.
*H04J 3/06* (2006.01)
*G04C 11/02* (2006.01)

(52) U.S. Cl. ........................ 370/345; 370/350; 368/47; 455/181.1; 455/245.1; 455/307; 455/340; 455/341

(58) Field of Classification Search ................ 370/345, 370/350; 455/181.1, 184.1, 234.1, 234.2, 455/241.1, 245.1, 307, 315, 334, 339, 340, 455/341; 368/47
See application file for complete search history.

(56) References Cited

U.S. PATENT DOCUMENTS 4,440,501 A 4/1984 Schulz
4,768,178 A 8/1988 Conklin et al.
4,823,328 A 4/1989 Conklin et al.
5,105,396 A 4/1992 Ganter et al.
5,349,570 A 9/1994 Kaiser
5,528,560 A 6/1996 Ogiyama
5,727,022 A 3/1998 Schaefer et al.

(Continued)

FOREIGN PATENT DOCUMENTS

DE 1 803 093 8/1969

(Continued)

OTHER PUBLICATIONS

Peter Hetzel, "Time Information and Normal Frequency" (Zeitinformation und Normalfrequenz), Telekom Praxis, vol. 1, 1993, pp. 25 to 36.

(Continued)

*Primary Examiner*—Philip J. Sobutka
(74) *Attorney, Agent, or Firm*—W. F. Fasse; W. G. Fasse

(57) ABSTRACT

A time signal carrying encoded time information transmitted at a transmission frequency from any one of plural time signal transmitters is received, amplified, and evaluated to acquire the time information. The transmission frequency of the received time signal is determined (provided is the time information signal's just emitted frequency f), and an amplification factor of the amplification of the signal is adjusted depending on the transmission frequency. A receiver circuit for a radio-controlled clock in this regard includes at least one amplifier having a variable amplification factor that is adjustable dependent on the frequency of the received time signal.

37 Claims, 5 Drawing Sheets

U.S. PATENT DOCUMENTS

| | | | | |
|---|---|---|---|---|
| 5,805,647 | A | 9/1998 | Schaefer et al. | |
| 5,818,851 | A | 10/1998 | Memmler | |
| 5,930,697 | A * | 7/1999 | Bohme et al. | 455/315 |
| 2003/0117901 | A1 | 6/2003 | Takada et al. | |
| 2003/0189876 | A1 | 10/2003 | Chan | |
| 2004/0198300 | A1 * | 10/2004 | Someya | 455/334 X |
| 2005/0036514 | A1 | 2/2005 | Polonio et al. | |
| 2005/0116856 | A1 | 6/2005 | Haefner et al. | |
| 2005/0122952 | A1 | 6/2005 | Haefner et al. | |
| 2005/0147080 | A1 | 7/2005 | Haefner et al. | |
| 2005/0169230 | A1 | 8/2005 | Haefner | |
| 2005/0175039 | A1 | 8/2005 | Haefner et al. | |
| 2005/0202796 | A1 | 9/2005 | Haefner et al. | |
| 2005/0260958 | A1 | 11/2005 | Haefner et al. | |

FOREIGN PATENT DOCUMENTS

| | | |
|---|---|---|
| DE | 27 01 609 | 2/1978 |
| DE | 26 43 250 | 3/1978 |
| DE | 28 02 040 | 7/1979 |
| DE | 30 15 312 | 10/1981 |
| DE | 31 01 406 | 1/1983 |
| DE | 32 36 162 | 4/1984 |
| DE | 33 46 091 | 7/1985 |
| DE | 35 04 338 | 8/1986 |
| DE | 35 16 810 | 11/1986 |
| DE | 37 19 650 | 12/1988 |
| DE | 37 33 966 | 4/1989 |
| DE | 3733965 | 4/1989 |
| DE | 4237112 | 5/1993 |
| DE | 4304321 | 8/1993 |
| DE | 4319946 | 12/1993 |
| DE | 42 27 502 | 3/1994 |
| DE | 4233126 | 4/1994 |
| DE | 93 00 945 | 5/1994 |
| DE | 42 42 384 | 6/1994 |
| DE | 43 32 798 | 3/1995 |
| DE | 44 03 124 | 8/1995 |
| DE | 44 12 892 | 10/1995 |
| DE | 44 42 818 | 6/1996 |
| DE | 195 14 036 | 10/1996 |
| DE | 19514031 | 10/1996 |
| DE | 195 40 592 | 5/1997 |
| DE | 19808431 | 9/1999 |
| DE | 298 13 498 | 12/1999 |
| EP | 0042913 | 1/1982 |
| EP | 0 201 061 | 11/1986 |
| EP | 1 079 554 | 2/2001 |
| EP | 1 316 861 | 6/2003 |
| JP | 11-030677 | 2/1999 |
| JP | 2002-286877 | 10/2002 |
| JP | 2003-125012 | 4/2003 |
| WO | WO2004/036742 | 4/2004 |

OTHER PUBLICATIONS

Reinhard Kalhoefer, “Die Realisierung kompakter stoersicherer Funkuhren mit den Mitteln der Mikroelktronik” (The Realization of Compact Interference-Resistant Radio-Controlled Clocks with the Means of Microelectronics), Darmstaedter Dissertation D 17; 1980; pp. 6-19, 50-59, 100-103, 124-129; p. 17 second paragraph, p. 58 last paragraph.

Wolfgang Hilberg, “Funkuhren” (Radio-Controlled Clocks); R. Oldenbourg Publishers, Munich, Federal Republic of Germany; Jan. 1983; ISBN 3-486-27341-8; pp. 219-234; p. 230 last paragraph.

Michael Arnoldt, “Zeitzeichen- und Normalfrequenzempfang (Time Signal and Normal Frequency Reception)”; Franzis’, Munich, Federal Republic of Germany; Jun. 1987; ISBN 3-7723-8171-5; pp. 29-41, 97, 124-161; p. 39 last paragraph Section 1.4.5; p. 40 section 1.4.6.

“Die erste Funkuhr am Handgelenk (The First Radio-Controlled Watch on the Wrist)”; article in magazine Funkschau 15/1990, pp. 52, 53.

* cited by examiner

RECEIVER CIRCUIT AND METHOD USING SELECTIVELY VARIABLE AMPLIFICATION FOR RECEIVING TIME SIGNALS FROM DIFFERENT TRANSMITTERS

PRIORITY CLAIM

This application is based on and claims the priority under 35 U.S.C. §119 of German Patent Application 103 57 200.7 filed on Dec. 8, 2003, and German Patent Application 10 2004 002 776.5 filed on Jan. 20, 2004, the entire disclosures of both of which are incorporated herein by reference.

FIELD OF THE INVENTION

The invention relates to a receiver circuit for a radio-controlled clock for receiving time signals transmitted from various different time signal transmitters, with an amplifier circuit for amplifying the received signals and a filter circuit for filtering the received signals. The invention further relates to a method of acquiring time information from the received time signal by means of such a receiver circuit, as well as a radio-controlled clock including such a receiver circuit.

BACKGROUND INFORMATION

It is conventionally known to provide time reference information in time signals that are transmitted by radio transmission from a time signal transmitter. Such a signal may also be called a time marker signal, a time data signal, a time code signal, or a time reference signal, for example, but will simply be called a time signal herein for simplicity. The time signal transmitter obtains the time reference information, for example, from a high precision atomic clock, and broadcasts this highly precise time reference information via the time signal. Thus, any radio-controlled clock receiving the signal can be synchronized or corrected to display the precise time in conformance with the time standard established by the atomic clock that provides the time reference information for the time signal transmitter. The time signal is especially a transmitter signal of short duration, that serves to transmit or broadcast the time reference information provided by the atomic clock or other suitable time reference emitter. In this regard, the time signal is a modulated oscillation generally including plural successive time markers, which each simply represent a pulse when demodulated, whereby these successive time markers represent or reproduce the transmitted time reference with a given uncertainty.

A time signal transmitter as mentioned above is, for example, represented by the official German longwave transmitting station DCF-77, which continuously transmits amplitude-modulated longwave time signals controlled by atomic clocks to provide the official atomic time scale for Central European Time (CET), with a transmitting power of 50 kW at a frequency of 77.5 kHz. In other countries, such as Great Britain, Japan, China, and the United States, for example, similar transmitters transmit time information on carrier waves in a longwave frequency range from 40 kHz to 120 kHz.

FIG. 1 diagrammatically represents the encoding scheme or protocol of a time code telegram A that pertains for the encoded time information provided by the German time signal transmitter DCF-77. The telegram in this case consists of 59 bits in 59 time frames, whereby each single bit or time frame corresponds to one second. Thus, the so-called time code telegram A, which especially provides information regarding the correct time and date in binary encoded form, can be transmitted in the course of one minute. The first 15 bits in bit range B comprise a general encoding, which contain operating information, for example. The next 5 bits in bit range C contain general information. Particularly, the general information bits C include an antenna bit R, an announcement bit A1 announcing or indicating the transition from Central European Time (CET) to Central European Summer Time (CEST) and back again, zone time bits Z1 and Z2, an announcement bit A2 announcing or indicating a so-called leap second, and a start bit S of the encoded time information.

From the $21^{st}$ bit to the $59^{th}$ bit, the time and date informations are transmitted in a Binary Coded Decimal (BCD) code, whereby the respective data are pertinent for the next subsequent or following minute. In this regard, the bits in the range D contain information regarding the minute, the bits in the range E contain information regarding the hour, the bits in the range F contain information regarding the calendar day or date, the bits in the range G contain information regarding the day of the week, the bits in the range H contain information regarding the calendar month, and the bits in the range I contain information regarding the calendar year. These informations are present bit-by-bit in encoded form. Furthermore, so-called test or check bits P1, P2, P3 are additionally provided respectively at the ends of the bit ranges D, E and I. The $60^{th}$ bit or time frame of the time code telegram A is not occupied, i.e. is “blank” and serves to indicate the beginning of the next time frame. Namely, the minute marker M following the blank interval represents the beginning of the next time code telegram A.

The structure and the bit occupancy of the telegram A shown in FIG. 1 for the transmission of time signals is generally known, and is described, for example, in an article by Peter Hetzel entitled “Zeitinformation und Normalfrequenz” (“Time Information and Normal Frequency”), published in Telekom Praxis, Vol. 1, 1993.

The transmission of the time marker or code information is performed by amplitude modulating a carrier frequency with the individual second markers. More particularly, the modulation comprises a dip or lowering or reduction X1, X2 (or alternatively an increase or raising) of the carrier signal X at the beginning of each second, except for the $59^{th}$ second of each minute, when the signal is omitted or blank as mentioned above. In this regard, in the case of the time signal transmitted by the German transmitter DCF-77, the carrier amplitude of the signal is reduced, to about 25% of the normal amplitude, at the beginning of each second for a duration X1 of 0.1 seconds or for a duration X2 of 0.2 seconds, for example as shown in present FIG. 2.

These amplitude reductions or dips X1, X2 of differing duration respectively define second markers or data bits in decoded form. The differing time durations of the second markers serve for the binary encoding of the time of day and the date, whereby the second markers X1 with a duration of 0.1 seconds correspond to the binary “0” and the second markers X2 with a duration of 0.2 seconds correspond to the binary “1”. Thus the modulation represents a binary pulse duration modulation. As mentioned above, the absence of the $60^{th}$ second marker announces the next following minute marker.

Thus, in combination with the respective second, it is then possible to evaluate the time information transmitted by the time signal transmitter. FIG. 2 shows a portion of an example of such an amplitude modulated time signal as discussed above. Note that the total duration of each time frame from the beginning of one dip to the beginning of the next dip or second marker X1 or X2 amounts to 1000 msec or 1 second, while the individual dips or amplitude reductions acting as second markers X1 and X2 respectively have individual durations of 100 msec or 200 msec, i.e. 0.1 seconds or 0.2 seconds, as described above for the German transmitter DCF-77.

The general technical background of radio-controlled clocks and receiver circuits for receiving time signals as generally discussed above are disclosed in the German Patent Publications DE 198 08 431 A1, DE 43 19 946 A1, DE 43 04 321 C2, DE 42 37 112 A1, and DE 42 33 126 A1. Furthermore, the methods and techniques for acquiring and processing the time information from transmitted time signals are disclosed in Patent Publications DE 195 14 031 C2, DE 37 33 965 C2, and EP 0,042,913 B1.

Present-day conventionally available time signal receivers are typically designed and constructed to operate with only a single reception frequency, and thus are adapted to receive only a single time signal transmitted at this single frequency from a particular time signal transmitter, and to decode and evaluate only this single time signal. However, new radio-controlled clocks and receiver circuits for radio-controlled clocks are now being developed, that are to be switchable among plural different frequencies. Thereby, such radio-controlled clocks and receiver circuits thereof are to be designed and adapted to receive and process respective time signals from various different time signal transmitters. Accordingly, these radio-controlled clocks must be able to simultaneously receive plural time signals in the frequency range from 40 kHz to 120 kHz. This requirement poses new problems for the reception, amplification, decoding, and evaluation of the respective time signals.

The various different time signal transmitters around the world, e.g. the official time signal transmitters in Germany, the United States, Great Britain, Japan, etc., respectively transmit their associated time signals at various different frequencies in the above mentioned range from 40 kHz to 120 kHz. For example, the German transmitter DCF-77 transmits at a frequency of 77.5 kHz, the British and US transmitters MSF and WWVB respectively transmit at a frequency of 60 kHz, the Japanese transmitter JJY transmits at a frequency of 60 kHz and a secondary or alternative frequency of 40 kHz, etc. Other time transmitters transmit their respective time signals at still other frequencies. In this regard, the various time signals with different carrier frequencies are typically received with different associated reception signal strengths or signal amplitudes. Namely, for example, the received signal amplitude of a low frequency time signal, e.g. around 40 kHz, is typically lower than the received signal amplitude of higher frequency time signals, e.g. in the range from 60 to 77.5 kHz. This is simply a feature or result of the transmission characteristics of the respective signals at these different frequencies.

After being received, the received time signals are amplified by an amplifier provided in the receiver circuit for this purpose. In this regard it is problematic, however, that the amplifier of the receiver circuit conventionally has a constant fixed amplification factor, so that it always amplifies the respective received time signal with the same amplification, regardless whether the received time signal has a relatively lower received signal strength or amplitude or a relatively higher signal strength or amplitude. Thus, the amplified signal output by the amplifier does not always have the optimum signal level for its further processing.

For example, the comparator of the receiver circuit is sometimes not able to correctly and reliably detect the second markers of the signal without problems, especially in a time signal with a lower signal amplitude, and most especially in the case when the time signal is falsified, obscured, or super-imposed with an interference signal. In such a case, the sensitivity and the accuracy of the receiver circuit and the decoding arrangement are thereby reduced. This can lead to problems and errors in the decoding and the subsequent evaluation of the time data encoded in the time signal.

In order to increase the sensitivity especially for low frequency time signals, it would be possible to design the amplifier of the receiver circuit for the "worst case" scenario, i.e. the situation of amplifying the time signal having the lowest frequency and thus the lowest received signal strength among the possible expected time signals. In other words, the amplifier is designed to constantly provide the highest amplification factor, that would pertain for the received time signal having the lowest received signal level or amplitude. Thereby, it is ensured that a low frequency time signal received by the receiver circuit will be sufficiently amplified, so that the following decoding arrangement and evaluating arrangement will have the desired sufficient sensitivity for achieving an accurate decoding and evaluation. The problem arises, however, that other time signals having a higher transmission frequency and thus typically a higher received signal amplitude, will be amplified at the same high amplification factor, leading to over-amplification of such signals. This has various disadvantages, in comparison to a circuit with a lower amplification factor that would be completely adequate for such received signals having a high received signal amplitude.

Thus, conventional receiver circuits simply provide a fixed higher amplification factor (which is higher than would be necessary for at least some received signals), in order to ensure an adequate reception sensitivity and reliability even for time signals with a low transmission frequency and thus low received signal amplitude. This directly leads to higher costs of the circuit for providing a higher power amplifier, and especially also causes a higher power consumption of the amplifier circuit, because the higher amplification factor requires higher amplifier currents and thus directly a higher power consumption. Especially for radio-controlled clock applications with a local limited energy supply, for example from primary batteries or accumulators (i.e. rechargeable secondary batteries), the power consumption and thus the energy consumption is a decisive criteria. Thus, in the above described systems, the amplifier designed for the "worst case scenario", leads to a relatively short operating life of the batteries, or the need to frequently recharge the accumulators.

SUMMARY OF THE INVENTION

In view of the above, it is an object of the present invention to develop a receiver circuit, a radio-controlled clock, and a method by which the receiver sensitivity can be made more independent of the transmission frequency. Particularly, the receiver sensitivity shall be substantially or nearly constant and uniform independently of the transmission frequency of the received time signal. In that regard, the reception sensitivity shall be sufficiently high so as to receive, decode, and evaluate any received time signal within the entire pertinent frequency range of possible transmission frequencies, with a sufficient accuracy, reliability and security, without leading to an excessive power consumption and thus energy consumption. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a receiver circuit for a radio-controlled clock for receiving respective time signals transmitted from various different time signal transmitters. The time signals respectively comprise or contain time informations in encoded form. The inventive receiver circuit includes at least one amplifier circuit for amplifying the received time signals. The amplifier circuit comprises a first amplifier having a variable adjustable amplification factor, that can be selected or adjusted depending on the frequency of the respective time signal being received.

The above objects have further been achieved according to the invention in a method of acquiring time information from received time signals in a receiver circuit including at least one amplifier. The method involves receiving a time signal, adjusting or selecting the amplification factor of at least one amplifier depending on the frequency of the received time signal, and amplifying the received signal with the adjusted or selected amplification factor.

The above objects have further been achieved according to the invention in a radio-controlled clock for acquiring time informations from received time signals, for example by means of a method according to the invention using a receiver circuit according to the invention. The radio controlled clock includes an antenna circuit for receiving the transmitted time signals, a receiver circuit connected to the antenna circuit, and a decoding and evaluating arrangement connected following or downstream from the receiver circuit and adapted to decode and evaluate the time signals received by the receiver circuit. The receiver circuit includes at least one amplifier having a variable, adjustable or selectable amplification factor dependent on the frequency of the respective received time signal.

The basic idea or concept underlying the present invention is to use a different amplification factor for different time signals received at different transmission frequencies from different time signal transmitters. Thus, more particularly, the invention provides at least one adjustable amplifier having an adjustable or selectable amplification factor in the receiver section of a radio-controlled clock for receiving time signals from various different time signal transmitters. The amplification factor of this amplifier is then to be adjusted or selected dependent on the transmission frequency of the particular time signal being received, decoded and evaluated at any time.

In comparison to the prescribed fixed or constant amplification factor of an amplifier in a conventional receiver circuit of a radio-controlled clock, the inventive provision of a receiver circuit with a variable adjustable amplification allows the amplification to be optimally adjusted or tuned depending on the transmission frequency of the time signal being received. This takes into account the fact that the reception signal strength or level of the received signal typically depends on the transmission frequency of that signal, with lower frequency signals typically having a lower reception signal strength. Thus, the invention allows such signals with a lower reception signal strength to be amplified with a higher amplification factor in comparison to the amplification factor used for amplifying a higher frequency signal that typically has a higher reception signal strength.

According to the invention, the amplification factor can be adjusted or selected so that the receiver circuit and/or the subsequent connected decoding and evaluating arrangement achieves a nearly constant reception sensitivity independent of the transmission frequency of the respective time signal being received. This simplifies and improves the accuracy of the decoding and evaluating of the received time informations, especially for such time signals that have been transmitted with a relatively low transmission frequency and thus typically would be received by the radio-controlled clock with a relatively low reception signal strength. Since the amplification factor is optimally adjusted for the respective signal being received, dependent on the transmission frequency thereof, this also ensures that the power consumption and thus energy consumption needed for the respective amplification will also be optimized, i.e. minimized for the particular prevailing circumstances.

Due to the necessarily provided bandpass structure of the receiver concept, it is typically necessary that low frequency time signals must be more strongly dampened than a higher frequency time signal. The inventive circuit arrangement provides a plurality of switchable selection devices with bandpass limited characteristics, whereby these individual selection devices are selectively switchable and thereby either connectable or disconnectable by means of the control arrangement. These switchable selection devices are embodied in such a manner so that they differently value the amplification differences of the respective receiving location or path of the receiver circuit and correspondingly increase or decrease the amplification of the respective selected receiver location or path dependent on the amplification. In this manner, the required sensitivity, which should be as constant as possible, can be achieved for the various different receiver locations, that are respectively allocated to various different transmission frequencies.

It is essential in at least one embodiment of the inventive receiver circuit, that the transmission frequency of the time signal that has been transmitted by a respective transmitter and is received by the receiver is either known or determinable. For this purpose, the inventive circuit arrangement includes a device or arrangement for automatic recognition of the transmission frequency of the received time signal. This arrangement for the automatic recognition of the transmission frequency comprises a regulating device or arrangement, that regulates in a following manner, i.e. readjusts, the amplification factor of the amplifier whenever an amplified time signal deviates from an expected amplified signal level. Particularly, the amplification factor is followingly regulated or readjusted until there is no more remaining deviation of the actual amplified signal level from the expected signal level. Since the amount or extent of the readjustment that will be necessary for each transmission frequency is known, therefore the current actual transmission frequency of the currently received time signal can be determined from the actual amount of the readjustment that is carried out.

An alternative embodiment provides a control and evaluating arrangement, which evaluates the amplified time signal. In this regard, the amplifier has been preadjusted to a specified nominal adjustment of the amplification factor that corresponds to a particular known transmission frequency, and the amplified time signal is initially amplified with this preadjusted amplification factor. The device or arrangement for the automatic recognition of the transmission frequency now derives the current actual transmission frequency from the amount of the deviation of the actual amplified signal level from the expected optimal signal value or level.

In a further similarly advantageous embodiment, the arrangement or device for the automatic recognition of the transmission frequency derives or determines the current actual transmission frequency directly from the received time signal itself. For this purpose, the received time signal is sampled and evaluated. The evaluation is typically carried out by a simple counter, which counts the sampled values so as to thereby determine the frequency of the transmitted and received time signal.

In a further particularly advantageous embodiment as an alternative to the preceding embodiment, the invention provides an arrangement for the automatic recognition of the encoding protocol of the received time signal, which evaluates the time signal to determine the encoding protocol thereof, and then determines the transmission frequency of the signal based on the encoding thereof. This embodiment of the invention is based on the recognition, that the encoding of a time signal is respectively characteristic for the various known time signal transmitters that transmit time signals around the world. For example, the German time signal transmitter DCF-77 encodes the time information in the time signal with exactly two different second markers represented by dips or reductions of the signal amplitude having a duration of respectively either 100 msec or 200 msec. In comparison, the British time signal transmitter MSF encodes the time information of the time signal using exactly two different second markers respectively having a duration of either 100 msec or 500 msec. The US time signal transmitter WWVB transmits a time signal encoding time information with three different second markers respectively having durations of 100 msec, 500 msec and 800 msec. The Japanese time signal transmitter JJY encodes the time information on the time signal using amplitude reductions or dips having three different durations just like the US transmitter WWVB, namely durations of 100, 500 and 800 msec. However, the Japanese transmitter JJY transmits the second markers in a so-called inverted format, whereby the amplitude dips occur at the ends of the respective time frames rather than the beginnings of the respective time frames. In a similar manner to the above described examples, the respective encoding protocols of other time signal transmitters also exhibit respective encoding parameters that are characteristic of the respective transmitter that has transmitted the particular signal.

If a particular encoding of a received signal can be allocated to a time signal transmitter that is characterized by such an encoding protocol, then the transmitting frequency that is characteristic for this transmitter is also known. In this manner, a conclusion as to the transmission frequency can be derived from the recognized protocol of the received time signal. Then, dependent on the determined transmission frequency, the amplification and therewith the receiver sensitivity is adjusted in a targeted manner as described above. For this purpose, suitable characterizing parameters of the various different encoding protocols for each possibly received time signal, and together therewith the corresponding transmission frequencies, are stored so that they can be recalled or looked-up, for example, in a memory arrangement particularly provided for this purpose.

A control arrangement is provided for adjusting the amplification of the receiver circuit and particularly of the amplifier thereof. This control arrangement produces a control signal with which the adjustable amplifier is controlled and activated in such a manner dependent on the recognized transmission frequency of the current received transmission signal, so that the amplification factor thereof is adjusted in a targeted manner to a desired amplification. Particularly in this regard, the amplification factor is adjusted in such a manner so that the most optimal receiver sensitivity is achieved.

Advantageously, the control arrangement also incorporates the arrangement or device for automatic recognition of the encoding protocol of the received time signal.

In a further embodiment of the invention, a plurality of switchable selection devices is provided. The respective selection devices are advantageously arranged parallel to one another, and connected after or downstream from the adjustable amplifier. A respective selection device is advantageously embodied as a bandpass filter with a very steep flank characteristic. Such a bandpass is particularly embodied as a narrow band filter that is preferably tuned, to the extent possible, to only a single available transmission frequency. The respective selection devices, which are typically embodied as respective quartz crystal or oscillator filters, in that regard are driven in their series resonance, and respectively form a low-ohm resistance in the frequency band of the bandpass. On the other hand, the resistance has a high ohm value outside of the narrow frequency band of the respective bandpass, so that only strongly damped frequency components are allowed to pass through the arrangement in a frequency range outside of the particular frequency band. In this manner, interferences having frequencies outside of the frequency band of the bandpass filter are strongly suppressed.

In order that only the particular selection device allocated to the particular current prevailing transmission frequency is activated, a controllable switch is provided and connected ahead of or upstream of a respective selection device. In this regard, any desired form of switch can be used as the controllable switch, as long as the switch can be selectively opened or closed in response to a simple control signal. For example, the controllable switches can be respectively embodied as transistors, for example MOSFETs, bipolar transistors, JFETs, thyristors, IGBTs or the like.

The control arrangement, which produces a control signal for adjusting the amplification factor of the first amplifier, additionally also provides a selection signal at a respective output thereof. This selection signal activates and switches on or closes the respective controllable switch associated and connected with the particular selection device that is tuned to the respective transmission frequency of the time signal that is currently being received. The remaining or other selection devices, of which the bandpass characteristics do not correspond with the current transmission frequency of the received time signal, are not switched on, i.e. the respective associated controllable switches thereof are not switched on or closed or activated by this particular selection signal.

In an advantageous further embodiment, a single bandpass filter is connected after or downstream of the adjustable amplifier or the parallel circuit of narrow-band selection devices. This bandpass filter provides a certain post-filtering of the time signal that has already been bandpass filtered in the selection device. Thus, this achieves an AC amplification of the filtered time signal. On the other hand, any DC offset of the filtered time signal is blocked or screened, so that DC components are thereby filtered out of the time signal. In this regard, such amplification of the DC components would have resulted in an excessively high DC offset of the amplified and filtered time signal. Thus, the subsequent bandpass filter achieves a suppression of the DC amplification. Instead of providing and using a single bandpass filter for each path of the parallel circuit of the selection devices, it would, of course, alternatively be possible to provide a respective particular bandpass filter individually for each respective selection device, whereby the respective bandpass filter is especially tuned for its associated particular selection device. However, such an arrangement would be much more complicated in terms of the circuit technology thereof.

According to a further advantageous embodiment of the invention, a second amplifier is provided and connected after or downstream from the first amplifier. This second amplifier serves to post-amplify the time signal that has already been amplified in the first amplifier and bandpass filtered in the selection devices. The use of such a second amplifier following the first amplifier is especially advantageous for energetic reasons. Namely, in this manner, it is possible to distribute the total cross-current or shunt current that is required for the total amplification among the plural amplifier stages. Thus, the individual components of the amplifier stages can be dimensioned smaller, whereby these exhibit a smaller total power consumption and thus a smaller total energy consumption.

In a particular embodiment, the first and/or the second amplifier is respectively embodied as a single stage or multistage differential amplifier. A further alternative embodiment involves the amplifier embodied as an operational amplifier, a transconductance amplifier or the like. In the embodiment using differential amplifier stages, the individual differential amplifier stages of the amplifier arrangement are advantageously controlled by the adjustment of the emitter currents thereof. The amplification factor is adjusted so that the controlled base currents in the amplifier are switched differently depending on the control signal. This necessitates a different amplification depending on the control signal, with which the individual differential amplifier stages are activated. Generally, any conventionally known manner of adjusting the amplification factor of an amplifier can be used.

In a particularly advantageous embodiment of the invention, the amplification factor of only one stage of the differential amplifier, especially its output stage, is adjustable. This is sufficient to provide an adjustable amplifier.

In a very advantageous further development of the invention, the adjustable amplifier comprises a base amplification that is especially designed or adapted to the requirements for an average frequency within a frequency range of the several transmission frequencies of the time signals of all possible or available time signal transmitters. Thereby, the receiver can easily be tuned to a particular transmission frequency deviating from the average frequency with only slight variations of the actual amplification factor from the base amplification.

The control arrangement is advantageously realized by a hard-wired logic circuit, for example an FPGA circuit or a PLD circuit. Fundamentally, the functionality of the control arrangement can also be carried out by a microcontroller that is typically already available in a radio-controlled clock circuit. Nonetheless, a special advantage of the solution according to the invention is that the adjustment of the amplification factor can be realized in a very simple manner through simple circuit technical means, namely in the control arrangements according to the invention, without having to burden the microcontroller in this regard. Thus, the resources of the microcontroller remain available for other tasks, for example for the decoding and evaluation of the time signal, the treatment of interferences in the time signal, and/or any other user-specific tasks.

According to the invention, the received time signal is first evaluated for determining the frequency thereof and thus for correspondingly adjusting the amplification factor. Based on this evaluation of the time signal, the encoding protocol of the transmitted time signal is automatically recognized. From the recognized encoding protocol, the particular time signal transmitter that has transmitted this time signal is recognized, for example by looking-up the pertinent correspondence or allocation in an allocation table linking the various encoding protocols with the associated transmission frequencies and/or other data identifying the transmitters, whereby this table may be stored in a memory provided for this purpose. Additionally or alternatively, the respective pertinent transmitter that has transmitted the received time signal can be determined by detecting, evaluating, and determining the transmission frequency. Thus, the transmission frequency, which has either been determined by a direct evaluation of the frequency or has been derived indirectly by recognizing the encoding protocol and linking the frequency to the protocol, is then allocated to or associated with the current time signal that is presently being received. As soon as the transmission frequency has been determined, the amplification is automatically tuned and adjusted for this transmission frequency of this current time signal, i.e. of the time signal transmitter that is transmitting the received signal, so that overall an optimum receiver sensitivity is achieved.

Advantageously in that regard, a low frequency time signal is amplified more strongly, i.e. with a higher amplification factor, than a higher frequency time signal. The terms "low frequency" and "high frequency" time signals refer to the frequency band in which the various time signal transmitters respectively transmit their associated time signals, e.g. in the present context this relates to the frequency range from 40 kHz to 120 kHz. So, a low frequency is in the lower end of this range, while a high frequency is in the higher end of this range, in this example.

In the case that the first amplifier is initially pre-adjusted to a base amplification, which is optimized for an average frequency within the above mentioned frequency range, then the amplification factor of the adjustable amplifier will be increased to a higher amplification above the base amplification if the actual frequency of the received time signal is below or lower than the average transmission frequency. On the other hand, if the actual frequency of the currently received time signal is greater than or above the average frequency, then the amplification factor of the adjustable amplifier will be reduced to an amplification below or less than the base amplification.

In a further developed embodiment of the invention, a control signal is provided for adjusting the amplification factor, whereby the control signal causes at least one of the amplifier stages of the adjustable amplifier to be controlled to an on or off state in a continuous manner. Thereby, an increasing or decreasing amplifier current can be achieved in a targeted or controlled manner. If, in this manner, the amplifier current is increased, then in total a higher amplification will result. On the other hand, a lower total amplification will be realized if the amplifier current through the amplifier stage is correspondingly reduced.

The time information is encoded in the time signal in a bit-wise manner, whereby a value of each respective data bit is determined from the time duration of a change or variation of the amplitude representing the data bit in a respective time frame of a time code telegram in the transmitted time signal. In this regard, a binary logic value may be allocated to each respective data bit, whereby this value is derived from the duration of the amplitude variation. In this regard, a first duration of the amplitude variation represents a first logic value of the data bit, while a second duration correspondingly represents a second logic value of the data bit. These first and second durations representing the respective logic values are predetermined or predefined by the particular encoding scheme or protocol used for encoding the time code telegrams of the time signal transmitted by the particular time signal transmitter. Typically, the first logic value represents a logic "0" (e.g. logic LOW, or low voltage level) while the second logic value represents a logic "1" (e.g. HIGH, or high voltage level). Nonetheless, the reverse logic allocation is also possible.

In most encoding protocols for encoding the telegrams of the time signals transmitted by official time signal transmitters, the above mentioned change or variation of the amplitude is particularly represented as a temporary reduction or dip of the amplitude of the time signal. Nonetheless, the opposite variation, namely a temporary increase or peak of the amplitude, can just as well be used for achieving a binary encoding of the data bits.

BRIEF DESCRIPTION OF THE DRAWINGS

In order that the invention may be clearly understood, it will now be described in connection with example embodiments thereof, with reference to the accompanying drawings, wherein.

Figure 1:
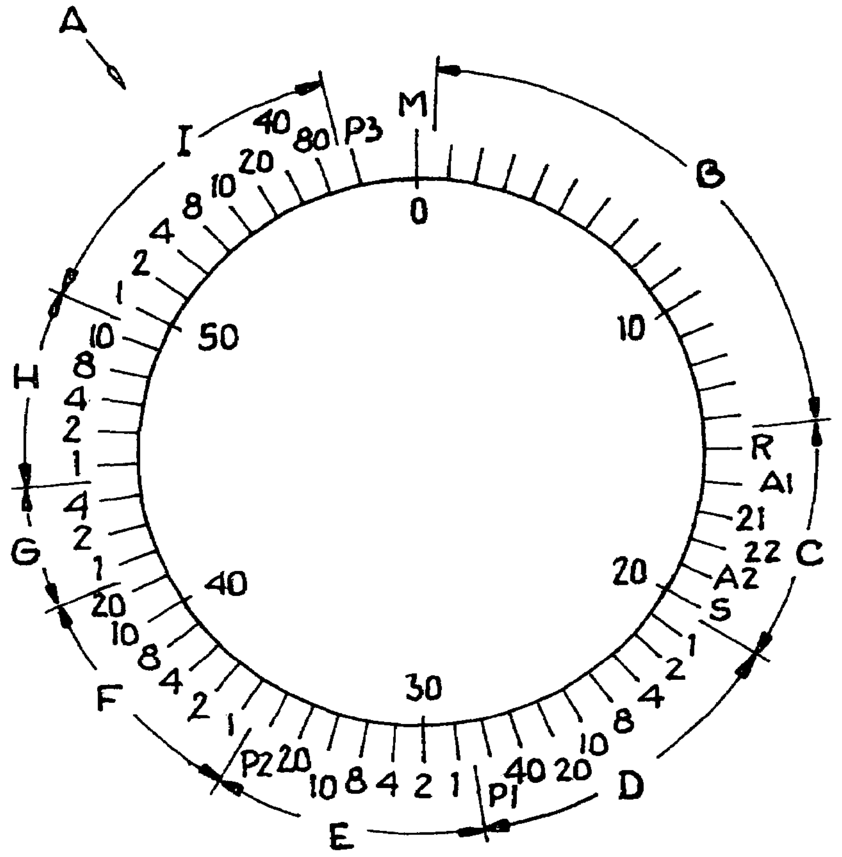
FIG. 1 schematically represents the encoding scheme of a time code telegram of encoded time information in a time signal transmitted by the official German time signal transmitter DCF-77, as conventionally known.

DETAILED DESCRIPTION OF PREFERRED EXAMPLE EMBODIMENTS AND OF THE BEST MODE OF THE INVENTION

In all of the drawing figures, the same elements and signals, as well as the elements and signals respectively having the same functions, are identified by the same reference numbers, unless the contrary is indicated.

Figure 2:
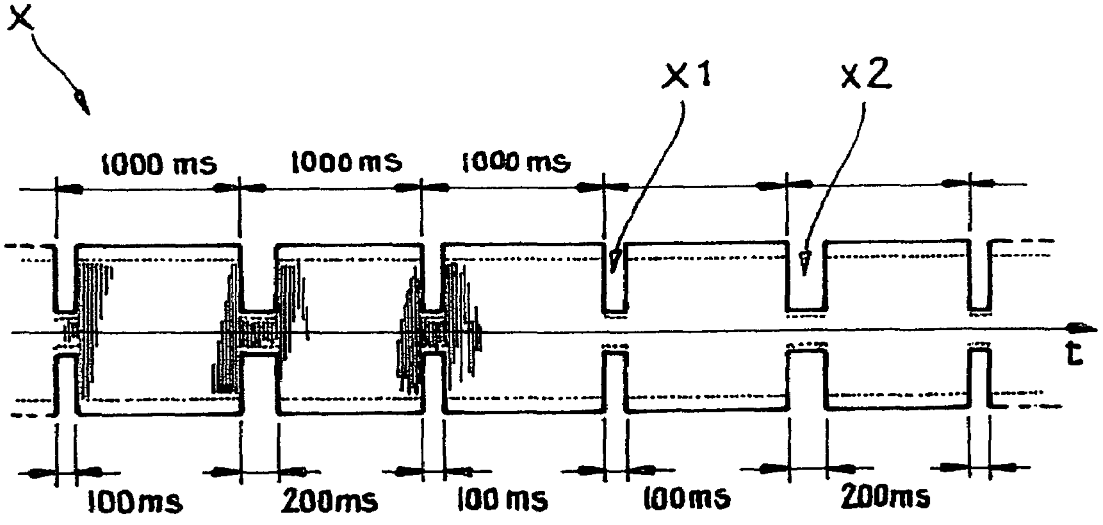
FIG. 2 is a time diagram representing a portion of an amplitude modulated time signal including five second markers as transmitted by the transmitter DCF-77.

The general format of an encoding protocol of a time code telegram A as conventionally known in the time signal transmitted by the official German time signal transmitter DCF-77 has been explained above in the Background Information section. Similarly, the time-variation of the amplitude-modulated time signal is schematically shown in the time diagram of FIG. 2, which has been discussed above as well.

Figure 3:
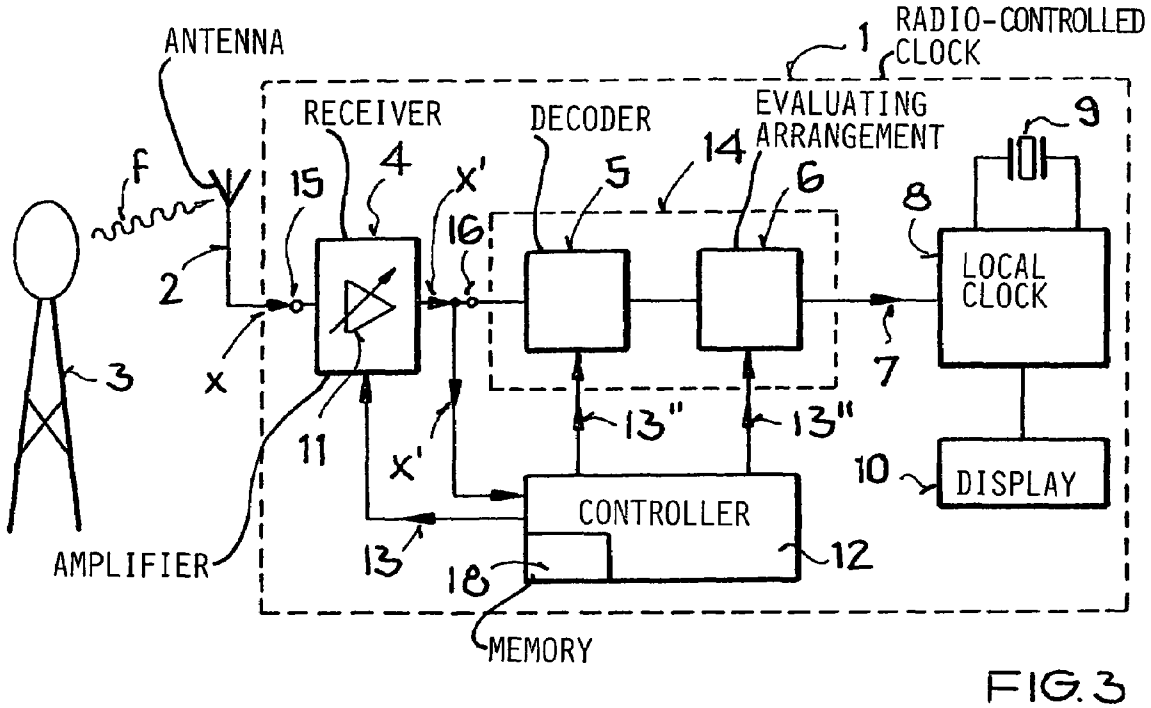
FIG. 3 is a block circuit diagram of a first variant of a radio-controlled clock with adjustable amplification according to the invention.

The block circuit diagram of FIG. 3 illustrates a first variant of a radio-controlled clock with adjustable amplification according to the invention. The radio-controlled clock 1 comprises one or more antennas 2 for receiving a time signal X transmitted by the time signal transmitter 3. The time signal X has a frequency f. The clock 1 further comprises a receiver circuit 4 for receiving the time signal X from the antenna 2, for which the receiver circuit 4 has its input 15 connected to the antenna 2. The receiver circuit 4 typically includes one or more filters, for example, bandpass filters, a rectifier circuit, and an amplifier circuit for filtering, rectifying, and amplifying the received time signal X. Most significantly for the present invention, the receiver circuit 4 comprises at least one adjustable amplifier 11 having an adjustable amplification factor, as will be discussed in detail further below. Namely, the particular construction and the function or operation of the receiver circuit 4 are described in detail below especially in connection with FIGS. 4 to 6.

The radio-controlled clock 1 further comprises a decoding arrangement or unit 5 connected following or downstream from, i.e. connected to the output 16 of, the receiver circuit 4, to decode the received, rectified and amplified time signal X' being output by the receiver circuit 4 at its output 16. An evaluating arrangement or unit 6 is connected following or downstream of the output of the decoding arrangement 5. This evaluating arrangement 6 serves to calculate or otherwise determine an exact clock time, i.e. time of day, and an exact date from the decoded data bits of the amplified time signal X'. Based on this calculated time and date, the evaluating arrangement 6 produces and outputs a time and date information signal 7. Throughout this specification, the term "time information" shall be understood as generally referring to and encompassing information regarding the clock time (time of day) and/or the date (e.g. calendar year, month and date, day of week, etc.).

In the present example embodiment, the decoding arrangement 5 and the evaluating arrangement 6 are respective components of a program-controlled arrangement 14, but instead they could be components of the receiver circuit 4 itself. In the present example embodiment, the program-controlled arrangement 14 is typically a microprocessor or especially a microcontroller, which may be embodied as a four-bit controller, for example, in the case of the present exemplary radio-controlled clock 1.

The radio-controlled clock 1 further comprises an electronic local clock 8, of which the local time is controlled based on the oscillation of a clock quartz crystal or oscillator 9. The electronic clock 8 is connected with an indicator 10, for example any suitable display 10, on which the clock time and/or date and the like are displayed. The electronic clock 8 also receives the time and date information signal 7 provided by the evaluating arrangement 6, whereupon the clock 8 calibrates, updates and/or corrects its displayed local time and/or date based on the time and date information signal 7.

As mentioned above, the receiver circuit 4 in the radio-controlled clock 1 according to the invention comprises at least one adjustable amplifier 11 having an adjustable amplification factor. A control arrangement 12 is provided for controlling the amplifier 11 and thus for adjusting or setting the amplification factor thereof. Additionally, the control arrangement 12 is designed and adapted to control the decoding arrangement 5 as well as the evaluating arrangement 6 with respective suitable control signals 13" provided from the control arrangement 12 respectively to the decoding arrangement 5 and the evaluating arrangement 6.

In the above context, the control arrangement 12 provides a prescribed control signal 13 to the receiver circuit 4 for controlling the same. In response to and dependent on this control signal 13, the amplifier 11 and the filter elements of the receiver circuit 4 will be correspondingly adjusted, such that the receiver circuit 4 produces at its output an amplified and, if applicable, filtered time signal X'. This amplified and filtered time signal X' is provided not only to the decoding unit 5 as described above, but also to a corresponding input of the control arrangement 12.

For achieving the exact and proper adjustment of the adjustable amplifier 11 or the filter elements, it is essential to exactly determine the transmission frequency f of the transmitted and received time signal X. In other words, only after the transmission frequency f is known, can the amplification factor of the amplifier 11 or the filter elements be optimally adjusted based on and corresponding to the control signal 13. The determination of the transmission frequency f is carried out in the control arrangement 12 in the following manner.

The various different encoding protocols of the various time signals respectively emitted by the various different official time signal transmitters are known as such. Suitable characteristic parameters of these various encoding protocols can be stored, for example in a memory arrangement 18 provided for this purpose within the control arrangement 12. For example, the various protocol data can be stored in the form of a look-up table in the memory unit 18. Furthermore, the respective transmission frequencies f associated respectively with the several different time signal transmitters are also known, and are similarly stored in the memory unit 18 so as to be linked to the associated protocol and/or transmitter. For each one of these transmission frequencies f, there is a particular optimum adjustment of the amplification factor as well as the filter elements of the receiver circuit 4 for this particular value of the transmission frequency f. These frequency-specific adjustments are advantageously also stored in the memory unit 18.

The transmission frequency f of a current time signal X that is actually presently being received can be determined according to a first method of the invention as follows. In this method, the elements or components of the receiver circuit 4, and especially the elements of the adjustable amplifier 11, are initially pre-adjusted to a prescribed nominal base adjustment or amplification factor. Thus, the receiver circuit 4 with these adjustments produces an amplified time signal X' having a certain amplified signal level. If this actual amplified signal level deviates from an expected nominal signal level corresponding to a particular transmission frequency f, then the amplifier 11 will be readjusted or regulated in a following manner until no more deviation or only a very small (acceptably small or negligible) deviation remains. For this purpose, the control arrangement 12 also provides a regulating circuit. Since the corresponding amount of a required readjustment for each particular transmission frequency f is known, the actually required amount of readjustment will very simply enable a direct conclusion as to the actual transmission frequency f of the time signal X being received.

In an alternative thereto, the invention provides a further method for determining the transmission frequency f of the current time signal X that is presently being received. In this method, the amplifier 11 is preadjusted to an optimum amplification adjustment that is optimized for a certain possible transmission frequency f. The receiver arrangement 4 thus produces an amplified time signal X', which is then evaluated in the control arrangement 12. If the evaluation determines that there is too large a deviation of the actual amplified time signal X' from the optimum signal value expected for this adjustment, this leads to the conclusion that the actual current transmission frequency f does not correspond to the frequency or the encoding protocol that was used for the assumed optimized preadjustment of the amplifier 11. In this case, the amplifier 11 is readjusted to another frequency, and the resulting deviation of the produced amplified time signal X' from the optimum signal value expected for this adjustment is again evaluated. This process is repeated until the remaining deviation is minimal (i.e. acceptably or negligibly small), and thereby the correct actual frequency f of the currently received time signal X has been recognized (with more or less accuracy to the extent required for the particular application).

While the example embodiment of FIG. 3 has the control arrangement 12 as a component of the radio-controlled clock 1 separate from the receiver circuit 4, i.e. not incorporated in the receiver circuit 4, it should be understood that at least a portion of the functions of the control arrangement 12 can be implemented directly in the receiver circuit 4.

Figure 4:
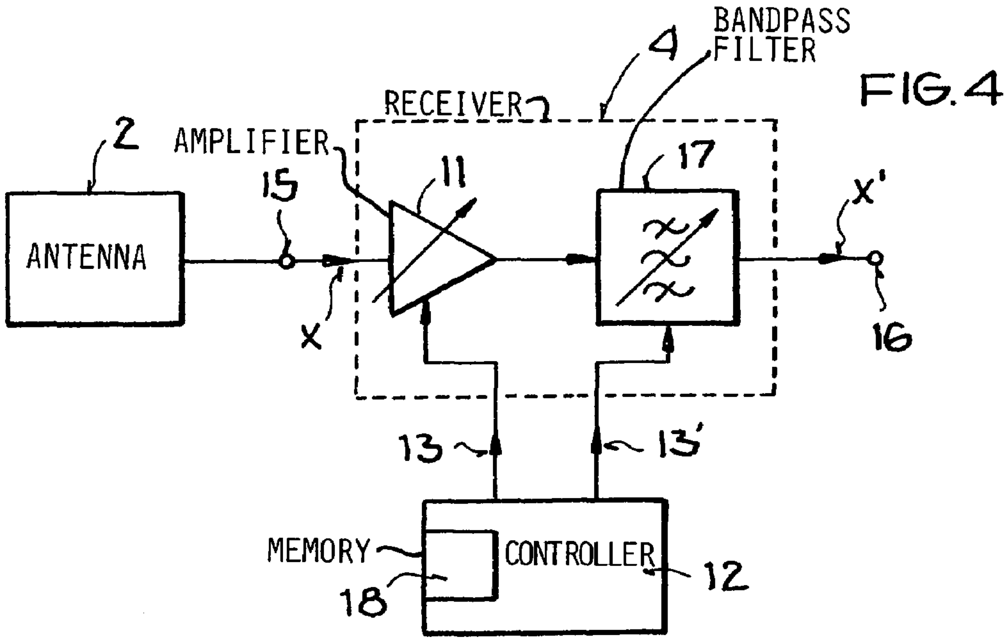
FIG. 4 is a schematic general diagram of an inventive receiver circuit for a radio-controlled clock according to FIG. 3.

FIG. 4 schematically represents a general illustration of a receiver circuit 4 for a radio-controlled clock 1 of FIG. 3 according to the invention. In this regard, the receiver circuit 4 comprises an input 15 and an output 16 as connected in the radio-controlled clock 1 as explained above with regard to FIG. 3. The receiver circuit 4 further comprises an adjustable amplifier 11 having an input connected to the input 15, and a bandpass filter 17 connected in series after the amplifier 11, whereby an output of the bandpass filter 17 is connected with the output 16. As indicated by the diagonal arrow through the amplifier symbol representing the amplifier 11, the amplification factor of this amplifier 11 is adjustable. This amplifier 11 may be embodied as a single stage or multistage amplifier. In the case of a multistage amplifier 11, at least one of the amplifier stages is adjustable, while at least one other amplifier stage may have a fixed amplification factor. The amplifier 11 receives a control signal 13 by which its amplification factor is adjusted. In the present example embodiment, the bandpass filter 17 is also adjustable with respect to its frequency range by means of a control signal 13'. The control signals 13 and 13' are provided by the control arrangement 12 as described herein.

Figure 5:
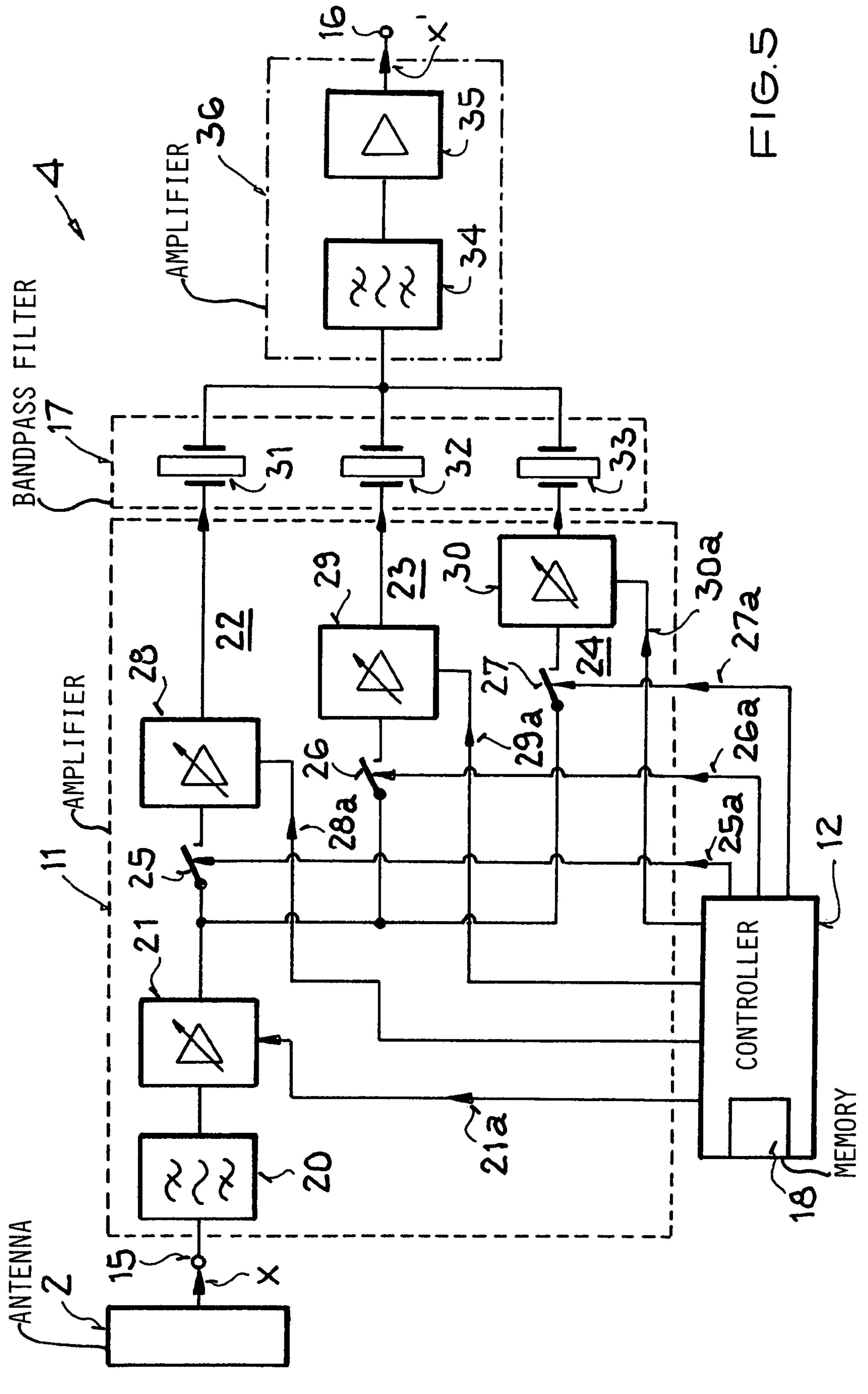
FIG. 5 is a schematic circuit diagram of a first embodiment of an inventive receiver circuit with adjustable amplification for a radio-controlled clock according to FIG. 3.

FIG. 5 shows further details of a first example embodiment of an inventive receiver circuit 4 with an adjustable amplification. The receiver circuit 4 comprises a first amplifier 11 having an adjustable amplification factor, and having an input side thereof connected via the input 15 to the antenna, antenna arrangement, or antenna circuit 2. A first adjustable bandpass filter 17 is connected to the output side of the first amplifier 11. A second amplifier 36 is connected after or downstream of the first bandpass filter 17, and functions as a post-amplifier.

In this context, the first amplifier 11 forms a regulating amplifier, and includes, on its input side, a second bandpass filter 20 that is connected with the input 15. The amplifier 11 further includes a first amplifier stage 21 connected downstream of or following the second bandpass filter 20. Furthermore, a parallel circuit of three amplifier paths 22, 23 and 24 is connected after or downstream of the amplifier stage 21. Each one of these amplifier paths 22 to 24 respectively includes a series circuit of a respective controllable switch 25, 26 or 27, a second amplifier stage 28, 29 or 30, and a quartz filter or frequency selection device 31, 32 or 33. In this regard, the controllable switches 25 to 27 as well as the second amplifier stages 28 to 30 are respective components of the first amplifier 11, while the quartz filters 31 to 33 are respective components of the adjustable bandpass filter 17.

In the present example embodiment, all amplifier stages 21 and 28 to 30 are controlledly activated by control signals 21A, 28A, 29A and 30A in such a manner, that a desired amplification factor is adjusted or set respectively in the respective amplifier stages dependent on these control signals. Also, the controllable switches 25, 26 and 27 are respectively controlled by corresponding control signals 25A, 26A and 27A.

All of the above mentioned control signals 21A, 25A, 26A, 27A, 28A, 29A and 30A are produced by the control arrangement 12. Furthermore, the control arrangement 12 determines the respective actual transmission frequency f of the currently received time signal X, for example according to one of the above described methods. Dependent on the determined or known transmission frequency f, a corresponding suitable amplification factor is set in the first amplifier 11. For this purpose, at least one of the amplifier paths 22 to 24, and especially exactly one single amplifier path 22, 23 or 24, is activated in that the appropriate control signal 25A to 27A is provided to the respective controllable switch 25 to 27 of this path 22 to 24 so as to activate, close or switch-on this switch. The other switches 25 to 27 remain deactivated, off or open.

In the present example embodiment, it is assumed that the controllable switch 25 is switched on by the corresponding control signal 25A, so that the corresponding amplifier path 22 is activated. Accordingly, suitable control signals 21A and 28A are then provided to the amplifier stages 21 and 28 so as to successively activate these amplifier stages to thereby produce a total or overall amplification comprising the individual amplifications of the two amplifier stages 21 and 28.

The amplifier stages 21 and 28 to 30 can be embodied as differential amplifiers or as individual differential amplifier stages. In order to adjust the amplification, these differential amplifier stages are activated in such a manner so that an adjustable cross current or shunt current and therewith the desired amplification are achieved. In order that the amplification of the first amplifier 11 overall or in total is adjustable, it is sufficient in principle if either the amplification factor of the amplifier stage 21 or the amplification factor of the amplifier stages 28 to 30 is adjustable. Generally it would be sufficient if no amplifier stage 21 or 28 to 30 is individually adjustable in order to achieve an overall adjustable amplifier 11. Namely, in the present example, since the amplifier stages 28 to 30 are selectively connectable to or disconnectable from the amplifier stage 21 through the respective controllable switches 25 to 27, a different overall amplification factor can be achieved simply by switching on or off each respective amplifier path 22 to 24. In this regard, it is simply necessary that the respective amplifier stages 28 to 30 have different amplification factors in comparison to each other, or in other words, that each amplifier stage 28 to 30 is respectively individually optimized to a respective different transmission frequency.

The quartz filters 31 to 33 are embodied as frequency-dependent selection devices with a bandpass limiting characteristic. Particularly, each quartz filter 31 to 33 comprises a different respective pass frequency. Thus, for example, the first quartz filter 31 has a pass frequency of 40 kHz, the second quartz filter 32 has a pass frequency of 60 kHz, and the third quartz filter 33 has a pass frequency of 77.5 kHz. Since typically only a single one of the controllable switches 25 to 27 is switched-on at any time, thereby an adjustable pass frequency is also achieved for the first bandpass filter 17. Thereby, the filter 31 to 33 are respectively individually matched to their connected amplifiers 28 to 30 for respective different frequency values of the received signal X.

The second amplifier or post-amplifier 36 connected following or after the bandpass filter 17 comprises a third bandpass filter 34 as well as a third non-adjustable or fixed-amplification amplifier 35. Thereby, the post-amplifier 36 produces a filtered and amplified time signal X', which is made available at the output 16.

Figure 6:
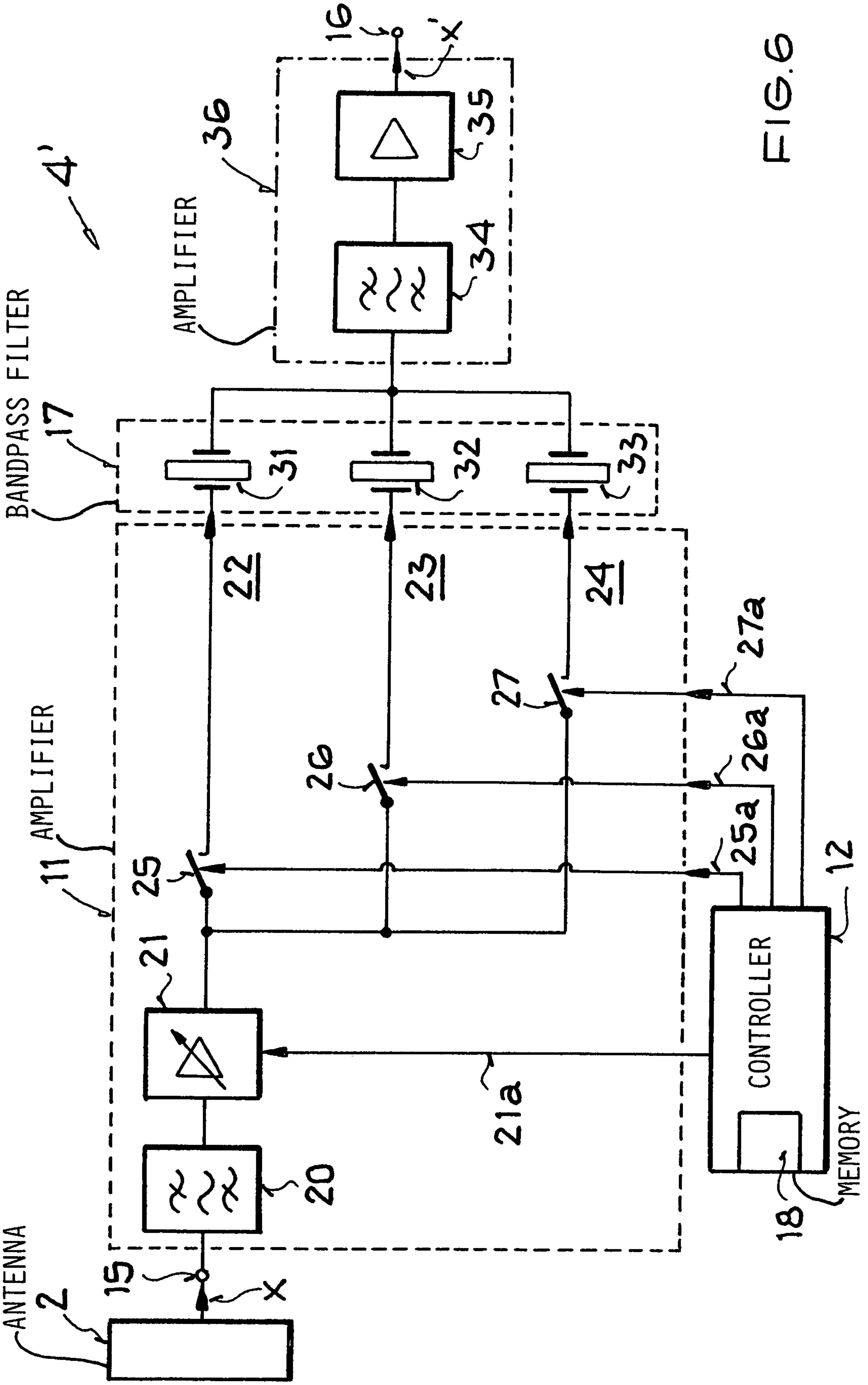
FIG. 6 is a schematic circuit diagram of a second especially preferred embodiment of an inventive receiver circuit with adjustable amplification for a radio-controlled clock according to FIG. 3.

FIG. 6 illustrates a second particularly preferred example embodiment of an inventive receiver circuit 4' with an adjustable amplification factor, sharing many similarities, but being simplified in comparison to the receiver circuit 4 of FIG. 5. Particularly, in comparison to FIG. 5, the present embodiment omits the amplifier stages 28 to 30 in the respective amplifier paths 22 to 24. The required functionality of these amplifier stages 28 to 30 is fulfilled by the single amplifier 21, which is, for example, a multi-stage differential amplifier, in which the amplification factor of at least one differential amplifier stage is adjusted in order to adjust the overall amplification. As a further alternative, it is possible to omit the single amplifier 21, and instead keep the individual amplifier stages 28 to 30 as shown in FIG. 5, so that the functionality of the omitted amplifier 21 is incorporated into and achieved in the amplifier paths 22 to 24.

Figure 7:
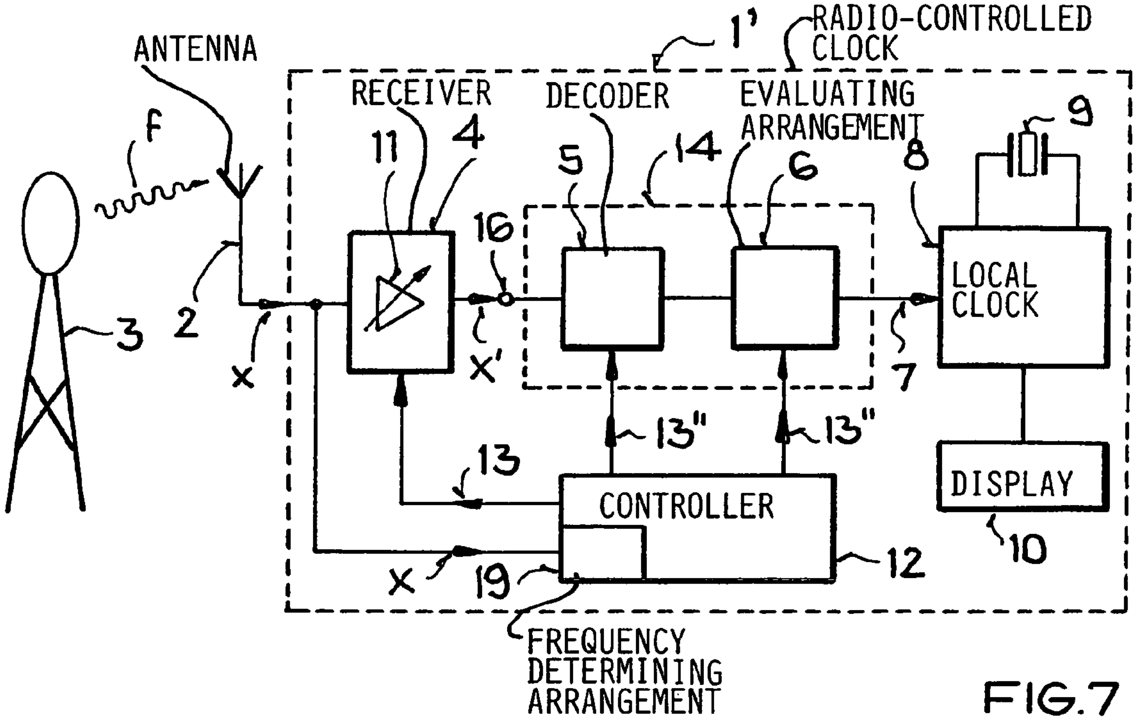
FIG. 7 is a block circuit diagram of a second variant of an inventive radio-controlled clock with adjustable amplification.

FIG. 7 illustrates a schematic block circuit diagram of a second variant of an inventive radio-controlled clock 1' with adjustable amplification, sharing many similarities, but also a difference relative to the clock 1 of FIG. 3. In comparison to the first variant of the radio-controlled clock 1 according to FIG. 3, in the clock 1' of FIG. 7 the control arrangement 12 has an input connected with the antenna 2, so that the control arrangement 12 similarly receives the incident time signal X. The control arrangement 12 includes an arrangement or device 19 for recognizing the transmission frequency f of the received time signal X by directly determining this frequency from the signal X. The control arrangement 12 then produces a control signal 13 derived from and/or dependent on the thusly recognized transmission frequency f. The control signal 13 is provided to the adjustable amplifier 11 in order to control the amplifier, for example in a manner as discussed above.

Although the present invention has been described above in connection with preferred example embodiments, the invention is not limited to these embodiments, but rather can be modified in a great number and variety of ways.

In the above example embodiments, the encoding was respectively realized by a reduction or dip of the amplitude of the carrier signal at the beginning or end of each respective time frame. Of course, the data encoding could alternatively be carried out by a temporary increase or peak of the carrier signal amplitude, or generally through any variation of the amplitude of the carrier signal in each respective time frame. Other types of signal modulation could alternatively be used.

In the above described example embodiments, the receiver circuit includes a first amplifier that is adjustable. Nonetheless, in the case in which the circuit arrangement includes a plurality of amplifiers and/or amplifier stages, any desired one of the amplifiers or amplifier stages can be adjustable in order to realize the desired overall adjustment of the total amplification.

It should further be understood that the disclosed concrete example embodiments of circuit arrangements are merely a few possible examples of a receiver circuit according to the invention, which may be varied very simply by exchanging individual or simple components or even functional units. Especially it should be recognized that the present disclosure purposely presents a particularly simple circuit-technical variant of a receiver circuit according to the invention.

The invention is also not limited to the particular numerical ranges or indications disclosed herein as examples. To the contrary, the scope of the invention also covers variations or changes of numerical values and ranges as would be understood by a person of ordinary skill in the art upon considering the present disclosure.

In the present example embodiments, a preferred architecture of a radio-controlled clock has been presented, but the invention is not limited thereto. To the contrary, the invention can be applied to all desired architectures of radio-controlled clocks in which at least one amplifier for amplifying the received time signal is correspondingly adjustable.

While the above discussion has especially related to a radio-controlled clock receiving the time signal via a wireless radio transmission, the present invention also relates to a method and clock apparatus and circuit arrangement receiving a time signal via hard-wired transmission. For example, systems including several clocks that are to be synchronized with one another and that are connected to each other by a time signal wire for this purpose, can also be embodied according to the present invention, and are covered within the scope of the appended claims. Such clocks may be generally regarded as remote-controlled clocks, but are also to be understood within the term radio-controlled clocks.

The above example embodiments relate to various different methods and arrangements for the automatic recognition of the transmission frequency of the received time signal. Nonetheless, it should be understood that additional or alternative methods for the recognition of the transmission frequency can be used according to the invention with similar advantage. For example, any other known or future developed methods for recognizing or determining a transmission frequency can be used.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement for a radio-controlled clock, comprising:

a reception input adapted to receive a received time signal carrying encoded time information;

an amplifier circuit, which is connected to said reception input, is adapted to amplify said received time signal to produce an amplified time signal, and includes at least one adjustable amplifier or amplifier stage having a variable amplification factor that is adapted to be adjusted in response to and dependent on a frequency of said received time signal;

an adjustable bandpass filter arrangement, which is adapted to be adjusted in response to and dependent on said frequency of said received time signal, is connected between said amplifier circuit and an output, and is adapted to filter said amplified time signal to produce an filtered amplified time signal at said output; and a control arrangement connected to control inputs of said amplifier circuit and of said adjustable bandpass filter, and adapted to provide to said control inputs respective control signals in response to and dependent on said frequency of said received time signal.

2. The circuit arrangement according to claim 1, wherein said control arrangement is adapted to determine said frequency of said received time signal and to generate said control signals dependent on said frequency of said received time signal.

3. A circuit arrangement for a radio-controlled clock having a reception input adapted to receive a respective received time signal from any one of plural different time signal transmitters, wherein said time signal carries encoded time information, said circuit arrangement comprises at least one amplifier circuit adapted to amplify said received time signal to produce an amplified time signal at an amplifier output of said amplifier circuit, and said amplifier circuit comprises a first amplifier having an amplification factor adapted to be adjusted in response to and dependent on a transmission frequency of said received time signal.

4. The circuit arrangement according to claim 3, further comprising an automatic frequency recognition unit that is connected to said reception input, and that is adapted to determine said transmission frequency of said received time signal.

5. The circuit arrangement according to claim 4, further comprising a control unit connected to said amplifier output, to a control input of said amplifier circuit and to said automatic frequency recognition unit;

wherein said control unit is adapted to monitor and compare said amplified time signal to an expected signal level, and to readjust said amplification factor of said first amplifier by a readjustment amount until there is no deviation of said amplified time signal from said expected signal level; and wherein said automatic frequency recognition unit is adapted to determine said transmission frequency from said readjustment amount.

6. The circuit arrangement according to claim 4, further comprising a control unit connected to said amplifier output and to said automatic frequency recognition unit;

wherein said control unit is adapted to monitor and compare said amplified time signal to an expected optimum signal level to determine a deviation therebetween, with said amplification factor of said first amplifier preadjusted to a nominal amplification factor corresponding to a nominal value of a frequency of said time signal; and wherein said automatic frequency recognition unit is adapted to determine said transmission frequency directly from said deviation between said amplified time signal and said expected optimum signal level.

7. The circuit arrangement according to claim 4, wherein said automatic frequency recognition unit is adapted to determine an encoding protocol of said encoded time information of said time signal, and to determine said transmission frequency from said encoding protocol.

8. The circuit arrangement according to claim 3, further comprising a control unit connected to a control input of said first amplifier, wherein said control unit is adapted to produce a control signal that controls said first amplifier and adjusts said amplification factor responsive to and dependent on said transmission frequency.

9. The circuit arrangement according to claim 8, wherein said control unit comprises a hard-wired logic circuit selected from the group consisting of an FPGA-circuit and a PLD-circuit.

10. The circuit arrangement according to claim 8, further comprising a plurality of switchable frequency-dependent selection devices having bandpass limiting characteristics, wherein said selection devices are connected and arranged parallel to one another on an output side of said first amplifier, and wherein said selection devices are respectively tuned to different values of said transmission frequency pertaining respectively to said time signal transmitters.

11. The circuit arrangement according to claim 10, wherein at least one of said selection devices comprises a narrow band quartz filter.

12. The circuit arrangement according to claim 10, further comprising a plurality of controllable transistor switches, with a respective one of said switches connected in series with a respective one of said selection devices.

13. The circuit arrangement according to claim 12, wherein said control unit is further connected to respective control inputs of said switches and is adapted to produce a selection signal that controls said switches so as to switch on at least one of said switches and a respective associated one of said selection devices connected thereto, responsive to and dependent on said transmission frequency.

14. The circuit arrangement according to claim 3, further comprising a single bandpass filter arranged and connected on an output side of said first amplifier and adapted to suppress a DC amplification and/or to filter out an offset of said amplified time signal.

15. The circuit arrangement according to claim 3, wherein said amplifier circuit further comprises a second amplifier connected on an output side of said first amplifier and adapted to post-amplify said amplified time signal.

16. The circuit arrangement according to claim 15, wherein at least one of said first amplifier and said second amplifier respectively comprises a single-stage or multi-stage differential amplifier.

17. The circuit arrangement according to claim 3, wherein said amplifier circuit comprises plural amplifier stages including said first amplifier in one amplifier stage, and wherein an amplification of only said one amplifier stage among said plural amplifier stages is adjustable.

18. The circuit arrangement according to claim 17, wherein said one amplifier stage is an output stage of said amplifier circuit.

19. The circuit arrangement according to claim 3, wherein said first amplifier is adapted to have said amplification factor pre-adjusted to a base amplification that is optimized for an average value of said transmission frequency within a range of frequencies pertaining to all of said time signal transmitters.

20. A radio-controlled clock comprising a circuit arrangement according to claim 3, wherein said reception input is an antenna input terminal adapted to be connected to a receiving antenna, and further comprising a decoding and evaluating arrangement connected to an output side of said amplifier circuit and adapted to decode and evaluate said encoded time information.

21. The radio-controlled clock according to claim 20, comprising a control unit logic circuit that includes said decoding and evaluating arrangement incorporated therein.

22. The circuit arrangement according to claim 3, further comprising a control arrangement adapted to determine said frequency of said received time signal and to generate, at a control arrangement output of said control arrangement, a control signal dependent on said frequency of said received time signal, and wherein said first amplifier has a control input connected to said control arrangement output so as to receive said control signal, and wherein said first amplifier is adapted to adjust said amplification factor in response to and dependent on said control signal.

23. A method of acquiring time information, comprising the steps:

a) receiving a time signal carrying encoded time information from any one of plural different time signal transmitters;

b) amplifying said time signal by an amplification factor to produce an amplified time signal;

c) determining a transmission frequency of said time signal;

d) adjusting said amplification factor in response to and dependent on said transmission frequency; and e) decoding and evaluating said amplified time signal to acquire said time information therefrom.

24. The method according to claim 23, further comprising:

pre-adjusting said amplification factor to a prescribed nominal amplification;

beginning said amplifying of said time signal with said amplification factor pre-adjusted to said prescribed nominal amplification;

evaluating said amplified time signal relative to an expected signal level that is expected for said prescribed nominal amplification to determine any deviation therebetween;

readjusting said amplification factor to successive different amplification factor values; and repeating said amplifying, said evaluating, and said readjusting successively by a total readjustment amount, until said deviation is zero; and wherein said step c) comprises determining said transmission frequency from an initial magnitude of said deviation and/or from said total readjustment amount.

25. The method according to claim 23, further comprising:

pre-adjusting said amplification factor to a prescribed nominal amplification that is allocated to a first transmission frequency value;

beginning said amplifying of said time signal with said amplification factor pre-adjusted to said prescribed nominal amplification;

evaluating said amplified time signal relative to a respective optimum signal value expected for said amplification factor currently prevailing so as to determine any deviation therebetween;

readjusting said amplification factor to successive different amplification factor values; and repeating said amplifying, said evaluating and said readjusting until said deviation is nearly zero with said amplification factor adjusted to a final selected one of said amplification factor values; and wherein said step c) comprises determining said transmission frequency as a transmission frequency preallocated to said final selected amplification factor value.

26. The method according to claim 23, further comprising:

evaluating said time signal to determine therefrom an encoding protocol of said encoded time information; and determining a particular transmitter among said time signal transmitters that uses said encoding protocol; and wherein said step c) comprises allocating to said transmission frequency a known frequency of said particular transmitter.

27. The method according to claim 26, wherein said evaluating involves evaluating an encoding of said encoded time information to recognize said encoding protocol therefrom.

28. The method according to claim 23, wherein said adjusting of said amplification factor in said step c) is carried out automatically based on said transmission frequency.

29. The method according to claim 23, further comprising determining an encoding protocol of said encoded time information automatically based on said transmission frequency.

30. The method according to claim 23, wherein said step c) comprises sampling and evaluating said time signal to obtain sampled values, and counting said sampled values to thereby determine said transmission frequency.

31. The method according to claim 23, wherein said amplification factor is relatively higher for a low value of said transmission frequency than for a high value of said transmission frequency.

32. The method according to claim 23, further comprising initially adjusting said amplification factor to a base amplification specified for an average frequency within a frequency range of respective transmission frequencies of all of said time signal transmitters, and wherein said adjusting of said amplification factor in said step d) comprises increasing said amplification factor to a value greater than said base amplification if said transmission frequency is below said average frequency.

33. The method according to claim 23, further comprising initially adjusting said amplification factor to a base amplification specified for an average frequency within a frequency range of respective transmission frequencies of all of said time signal transmitters, and wherein said adjusting of said amplification factor in said step d) comprises decreasing said amplification factor to a value less than said base amplification if said transmission frequency is above said average frequency.

34. The method according to claim 23, wherein said step d) comprises providing a control signal that continuously controls at least one amplifier stage to be activated or deactivated.

35. The method according to claim 23, wherein said time signal comprises a succession of time frames that each respectively have a fixed duration, said time information is encoded bitwise in said time frames with at least one data bit respectively encoded in each one of said time frames, a logic value of each respective one of said data bits is determined by a respective duration of a respective variation of an amplitude of said time signal corresponding to said respective data bit, a first said logic value is allocated to a first said duration, and a second said logic value is allocated to a second said duration.

36. The method according to claim 35, wherein said first logic value is a logic zero and said second logic value is a logic one.

37. The method according to claim 35, wherein said variation of said amplitude is a temporary reduction of said amplitude of said time signal.

* * * * *